United States Patent [19]
Hurue

[11] 3,743,750
[45] July 3, 1973

[54] TOY CALCULATOR FOR EDUCATION

[76] Inventor: Motoi Hurue, 92 Aza-Nakamura, Ama-gun Aichi-ken, Japan

[22] Filed: Sept. 12, 1972

[21] Appl. No.: 288,408

[30] Foreign Application Priority Data
Oct. 2, 1971  Japan.................. 46/77240

[52] U.S. Cl................................... 35/31 D
[51] Int. Cl. ............................... G09b 19/02
[58] Field of Search ............... 35/31 R, 31 B, 31 D, 35/31 E, 75, 77

[56] References Cited
UNITED STATES PATENTS

| | | | |
|---|---|---|---|
| 565,797 | 8/1896 | Roller | 35/75 |
| 613,432 | 11/1898 | Szenhak | 35/77 X |
| 1,289,743 | 12/1918 | Hammond | 35/75 |

*Primary Examiner*—Wm. H. Grieb
*Attorney*—Linton & Linton

[57] ABSTRACT

A toy calculator comprises a flat case member with its interior space divided into parallel channels and calculating bars having a form insertable into said channels. Some of numerals and symbols constituting an arithmetic equation are drawn on the calculating bar and the others and an answer numeral are drawn on the wall of the channel. Windows are bored through the wall at least for seeing the numerals drawn on the calculating bar.

2 Claims, 7 Drawing Figures

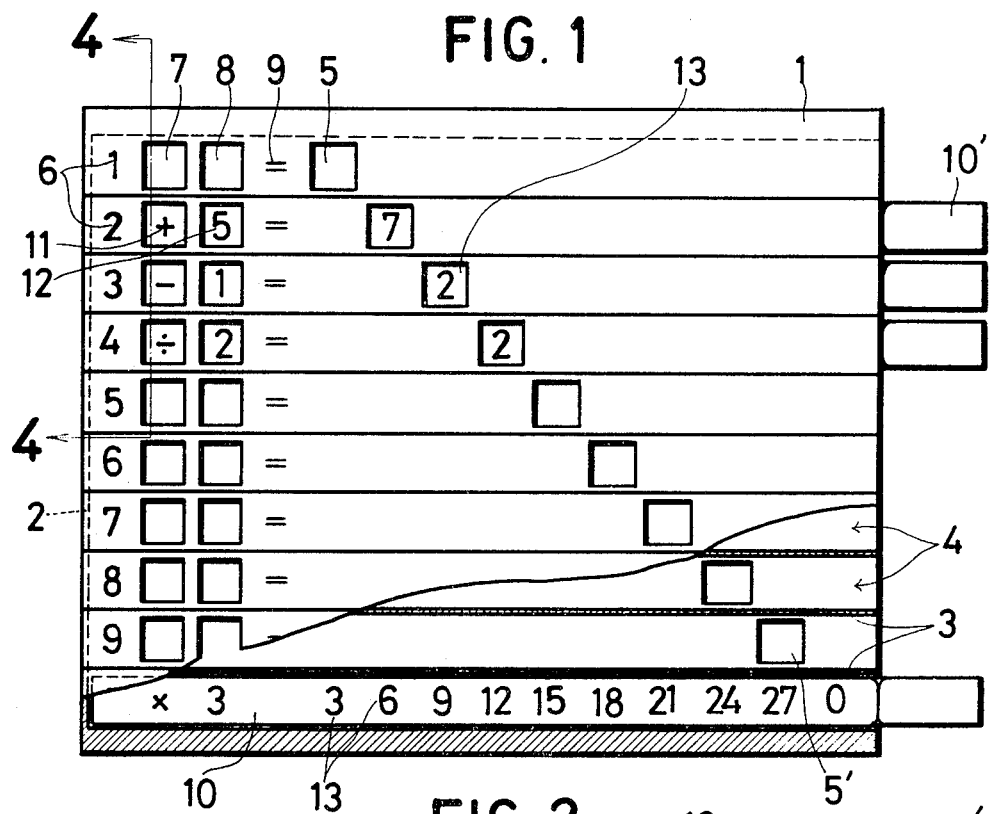
FIG. 1
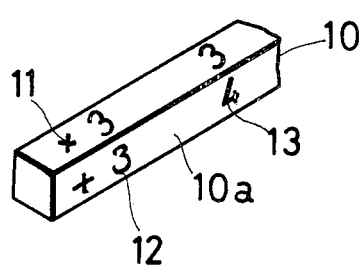
FIG. 2
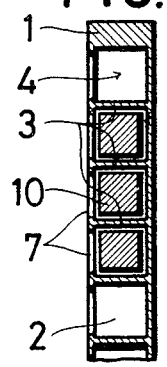
FIG. 3
FIG. 4

FIG. 5
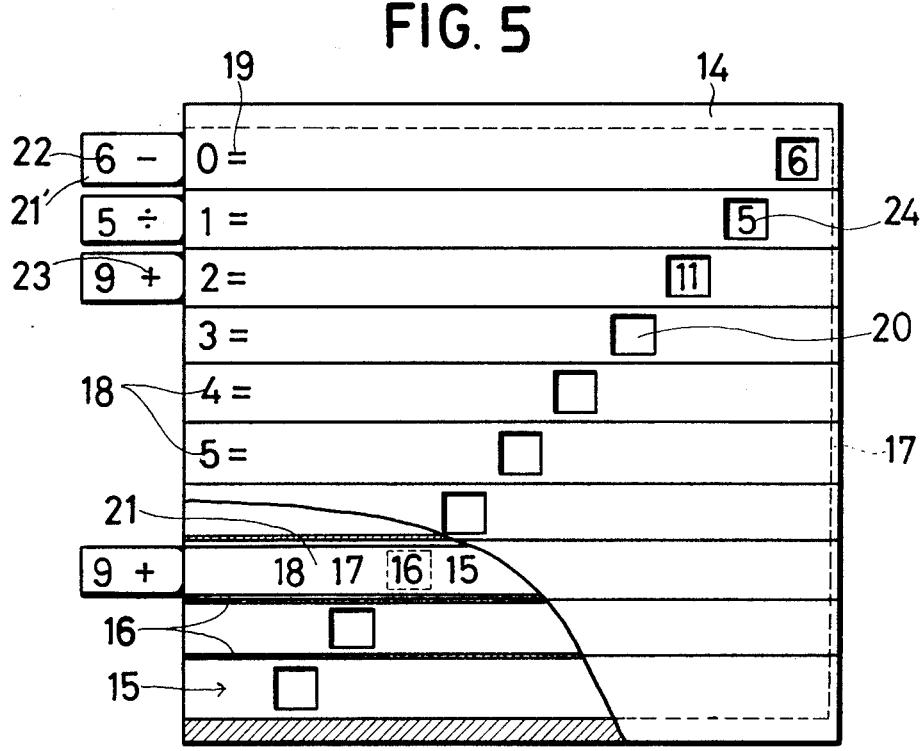
FIG. 6
| 9 + | 18 17 16 15 14 13 12 11 10 9 |
| 9 × | 81 72 63 54 45 36 27 18 9 0 |
| 9 − | 0 1 2 3 4 5 6 7 8 9 |
| 9 ÷ | 1 0 0 0 0 0 0 0 9 0 |
FIG. 7
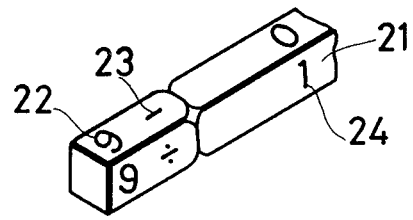

TOY CALCULATOR FOR EDUCATION

BACKGROUND OF THE INVENTION

This invention relates to a toy calculator with which lower class school children or preschool children amuse themselves to be interested in the four rules of arithmetic. The toy calculator has a basic requirement that it should be simple both constructionally and operationally. On the other hand it is desirable that exercises as many as possible can be carried out with use of a calculator. Also, the toy calculator is preferably small, compact and elegant. Among the conventional toy calculators, there are those of simplified slide rule type or those of abacus type. However, these types of toy calculators are not very simple in its operation because the children must count numbers such as a summand and a subtractor and shift a scale or beads by corresponding units. Further, these toy calculators can not display the equation for example of a multiplication or a division together with the result of the operation.

SUMMARY OF THE INVENTION

A toy calculator according to the present invention includes a case member and sectionalizing plates defining a number of parallel channels and calculating bars having a form suitable for slidable insertion into the channels. On each of the top wall of the channels, some of an operated numeral such as a summand of an operation such as an addition, an operating numeral, an operation symbol such as + and a sign of equality are drawn. The others of them and an answer numeral resulting from the operation are drawn on each of the calculating bars. At least one window (an answer window) is bored through the top wall of the channel for seeing the answer numeral. The windows for seeing the answer numerals are not aligned in the direction perpendicular to the channels but are arranged obliquely with respect to the channels. The answer numeral is drawn on the calculating bar at the position where it can be seen through the answer window when the calculating bar is inserted in the channel. A child can see the answer numeral through the answer window merely by inserting the calculating bar into the channel. When other kind of operations are carried out or the operated and/or operating numerals are changed, other calculating bars are used. Because of the oblique arrangement of the answer windows, the calculating bars can be made of the same length and the child has only to insert the calculating bars by a common depth without changing the depth of insertion according to different operations.

The salient relationships of the present invention have been described and it will be clear that the toy calculator of the present invention is small and compact in construction and is operationally so simple as even preschool children can easily operate and enjoy it.

IN THE DRAWINGS

FIG. 1 is a plane view of a toy calculator with some part of a top wall being broken away:

FIG. 2 is a developed view of one of calculating bars of the calculator of FIG. 1:

FIG. 3 is a perspective view of the calculating bar of FIG. 2 with part of it being cut away:

FIG. 4 is a section taken on line 4—4 of FIG. 1:

FIG. 5 is a plane view of another toy calculator shown an alternative embodiment with some part of a top wall being cut away:

FIG. 6 is a developed view of one of calculating bars for the calculator shown in FIG. 5: and FIG. 7 is a perspective view of the calculating bar of FIG. 6 with some part of it being cut away.

Referring to FIGS. 1–4, numeral 1 represents a flat case made of metal or plastics with its one end opened and the other end closed by an end plate 2. Eight sheets of sectionalizing plates 3 define the space of the case 1 into nine parallel channels 4. Each of the channels is provided with an answer window 5. All the answer windows 5 are not aligned in a direction at right angles with the channels 4 but are arranged obliquely with respect to the channels. An operated numeral 6 such as the multiplicand of a multiplication is drawn on the extreme left hand part of the top wall of each channel 4. Each channel 4 is provided with an operation symbol window 7 and an operating numeral (such as the multiplier of a multiplication) window 8 bored through the top wall of the channel 4 between the operated numeral 6 and the answer window 5. A sign of equality 9 is drawn on the top wall of the channel 4 between the operating numeral window 8 and the answer window 5. Calculating bars 10 have a rectangular section suitable for insertion into any of the channels 4 and such a sufficient length that the grip portion 10' of the calculating bar 10 can extend from the channel 4 when the calculating bar 10 is inserted into the channel 4 by a full depth. On one of the side surfaces of the calculating bar 10, are drawn an operation symbol 11 and an operating numeral 12 so that they may be seen through the corresponding windows 7 and 8 when the calculating bar 10 is inserted into the channel 4 by the full depth. On the same side surface of the calculating bar 10, a series of answer numerals 13 are drawn so that they can be seen through the corresponding answer windows 5 when the calculating bar 10 is inserted into different channels 4 by the same full depth. The four side surfaces of a calculating bar 10 are assigned to the four rules of arithmetic respectively as shown in FIG. 3 and the nine calculating bars are sufficient if the operating numerals 12 are limited to 1–9. Answer windows 5' may be bored also through the bottom walls of the channels 4.

The operation of the above described toy calculator is as follows. If the calculating bar 10a especially designated by reference numeral is inserted in the channel 4 corresponding to an operated numeral 2, then an answer numeral 5 is seen through the answer window 5. If the same calculating bar 10a is inserted in the channel 4 corresponding to an operated numeral 1, then an answer numeral 4 is seen through the answer window 5. Thus, a child using the toy calculator can see equations 2+3=5 and 1+3=4 together with the resulting answer numerals by a very symple operation of insertion.

Referring to FIGS. 5–7, another embodiment is described. The space of a flat case 14 is divided into channels 15 by sectionalizing plates 16. Only the one end of each channel 15 is closed by an end plate 17. On the top wall of each channel 15, an operating numeral 18 and a sign of equality 19 are drawn at the extreme left hand portion. Answer windows 20 are bored through the top walls of the channels 15 to the right hand side of the sign of equality 19. These windows 20 are arranged obliquely as in the case of the foregoing embodiment. Calculating bars 21 have a rectangular section suitable for insertion into any of the channels 15 and such a sufficient length that a grip portion 21' formed as one end portion of the calculating bar 21 can extend from the channel. On the side surface of the grip portion 21', an operated numeral 22 and an operation symbol 23 are drawn. Answer numerals 24 are drawn on the same side surface of the calculating bar 21 at such positions where answer numerals 24 can be seen through the corresponding answer windows 20 when the calculating bars 21 are inserted in different channels 15. The operation of the thus embodied toy calculator can be easily understood from that of the foregoing embodiment and the description of the present embodiment is omitted.

What I claim is:

1. A toy calculator comprising a flat case with its one end open, sectionalizing plates definining parallel channels, operated numerals, each of said operated numerals being drawn on a closed end side of the top wall of each of said channels, operation symbol windows, each of said windows being bored through said top wall to the right hand side of said operated numeral, operating numeral windows, each of said windows bored through said top wall to the right hand side of said operation symbol windows, signs of equality, each of said signs being drawn to the right hand side of said operating numeral window, answer windows, each of said windows being bored through the top wall of said channels to the right hand side of said signs of equality in a manner that they are arranged obliquely with respect to said channels, calculating bars having a form suitable for insertion into said channels and combinations of an operation symbol, an operating numeral and answer numerals drawn on the side surfaces of said calculating bars in a manner that one of said combinations can be seen through said corresponding windows.

2. A toy calculator comprising a flat case with its one end open, sectionalizing plates defining parallel channels, operating numerals, each of said numerals being drawn on the open end side of each top wall of said channels, signs of equality, each of said signs being drawn to the right hand side of said operating numeral, answer windows, each of said windows being bored through the top wall of said channels to the right hand side of said signs of equality in a manner that they are arranged obliquely with respect to said channels, calculating bars having a form suitable for insertion into said channels, grip portions formed as an end portion of said bar extending from said channel when said bar is inserted in said channel, and combinations of an operated numeral and an operation symbol, each of said combinations being drawn on the side surface of said grip portion.

* * * * *